Figure 3:
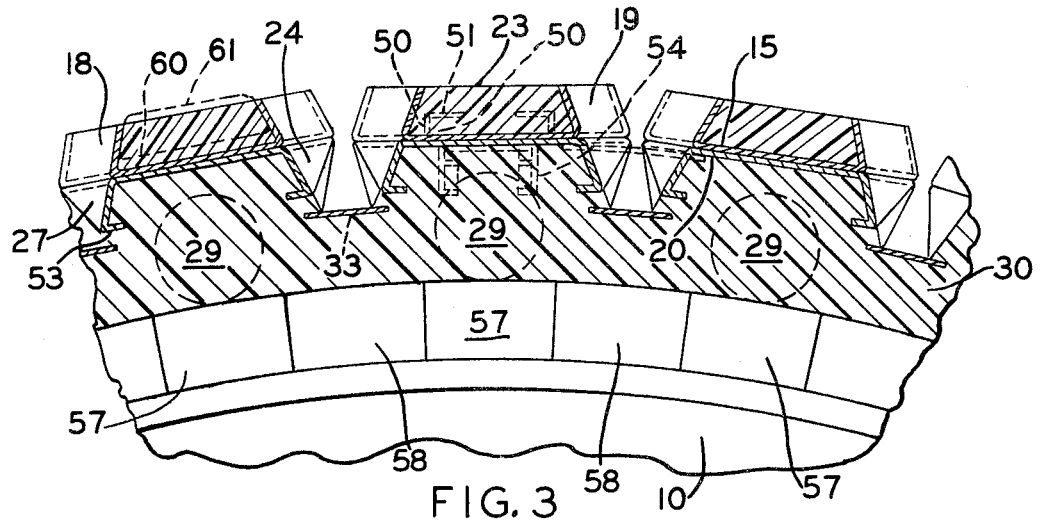

March 1, 1966 H. J. PAYNTER 3,237,668
VEHICLE TIRE
Filed Dec. 21, 1964 2 Sheets-Sheet 1
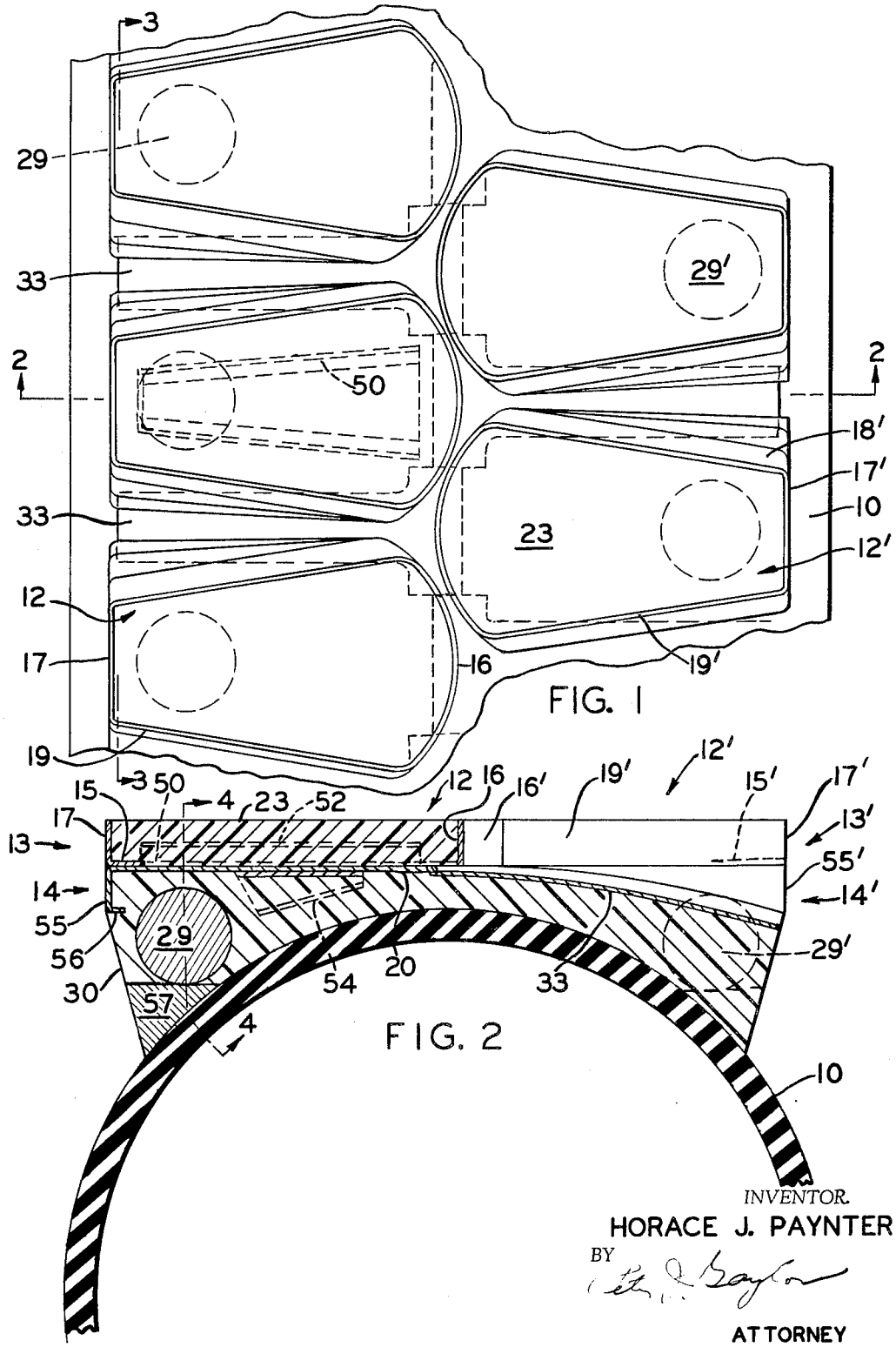
INVENTOR.
HORACE J. PAYNTER
BY
ATTORNEY March 1, 1966      H. J. PAYNTER      3,237,668

VEHICLE TIRE

Filed Dec. 21, 1964      2 Sheets-Sheet 2

*INVENTOR.*
HORACE J. PAYNTER
BY
ATTORNEY

United States Patent Office 3,237,668
Patented Mar. 1, 1966

3,237,668
VEHICLE TIRE
Horace J. Paynter, Summit, N.J., assignor to
Norman C. Heinle, Short Hills, N.J.
Filed Dec. 21, 1964, Ser. No. 419,736
13 Claims. (Cl. 152—175)

This invention relates to a demountable pneumatic tire for vehicles. More specifically, it deals with a tire carrying flat tread elements, each encased in a framework of rigid sheet material, and designed to present a flat surface during rolling on a pavement. Other features include springy supporting means for the thicker outer portion of the tread, flat metal deflecting plates disposed under and between tread elements, as well as additonal features to be described.

Automobile tires of present day construction have a rounded periphery along the width of the tire. In such cases, it has been found that, as the loaded wheel carrying such a tire rolls over a pavement, the flattening out, or flexure, of the tread causes attrition of the rubber and of the pavement, resulting in considerable wear of the tire as the tread is compressed to a flat condition, and then released to normal condition when it leaves the pavement. Also, such tires present only a portion of their available traction surface, so that they are subject to more skidding propensity than if the entire tread surface were available for contacting the road. Furthermore, rubber tends to heat up rapidly when flexed, and there is no way of dissipating such heat from conventional tires, except by natural connection from the surface. Other disadvantages of conventional tires include ease in puncturing by sharp objects, poor traction on ice and snow, requirement for carrying a spare, seasonal changing of tires for snow, etc.

According to the present invention, a tire is constructed which employs a flat tread surface in the form of tread elements which are retained by a metal framework, so that the latter serves as a spreading-restraining means for the rubbery compound. This minimizes greatly the lateral flexing, thereby reducing to a minimum the attrition which is normally encountered in the flexing of round treads of conventional tires. Furthermore, the tire is protected by metal plates under said tread elements and between the elements, so that the plates and the framework not only serve as deflectors for preventing the piercing of the tire, but also as conductors and radiators of heat to more rapidly dissipate the heat from the rubbery composition. The protection, by metal, of otherwise unprotected surface areas of the tire makes it possible to state that the tire is entirely puncture-proof with respect to the road contact area. Since the tire tread is flat, the entire surface thereof is available as traction area. Such tires may be employed with excellent traction for snow and ice use, as well as for summer driving, and they exhibit little wear when compared with conventional tires. Thus, the tires serve admirably for private cars, in the city or country, as well as for buses and trucks, for land rovers in use on farms, fields and meadows, and for driving through mud or snow, while still adapted for quiet city driving on concrete or macadam roads. Wear is minimized because there is little relative movement due to lateral flexing when the tire is rolling on or off the road, or due to flexing of the tread while the wheel is changing its angular position during steering. Tires of the present invention not only show little wear, but they reduce fuel consumption due to the absence of a great portion of conventionally-encountered friction.

Figure 4:
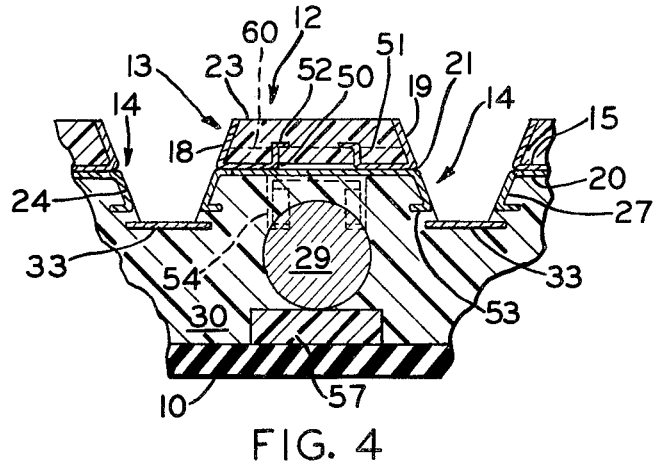

The invention will be more readily understood by reference to the accompanying drawing, in which a preferred embodiment is described, and in which FIGURE 1 depicts a top view of a portion of a tire of the present invention, the portion being cut away across the width of the tire. FIGURE 2 presents a cross-sectional view across the width of the tire, taken along the plane of line 2—2 of FIGURE 1. A cross-sectional view taken along the length of the tire through a row of successive tread elements, and along the plane of line 3—3 in FIGURE 1, is shown in FIGURE 3, while FIGURE 4 illustrates a cross-sectional view taken through one tread element and portions of adjacent elements, along the planes of lines 4—4 of FIGURE 2. The same numerals refer to similar parts in the various figures.

Referring again to the drawing, numeral 10 represents generally the carcass of a tire of the present invention, including the cord portion. Superimposed over the cord portion, and vulcanized, or otherwise bonded thereto, are the tread elements, indicated generally as 12 and 12'. As can be seen from FIGURE 1, the tread elements are in the form of trays, and are desirably in the form of spaced polygons, say, of generally triangular or tetragonal shape, with the innermost sides wider than the outermost sides. These tread elements 12–12' are desirably spaced in two lateral rows, those in one row being disposed in staggered relation with respect to those in the other row, and each (12) of the elements of one row being substantially the mirror image of each (12') of the other row.

Each tread element 12 or 12' consists of an upper tread portion 13 or 13', respectively, superimposed over a lower tread portion 14 or 14', respectively. Upper tread portion 13 or 13' consists of a receptacle resembling a shallow tray or cup made of metal sheet, such as hard steel about $\frac{1}{32}$" thick, and it includes bottom 15–15', inner upright side 16–16' (which desirably is arcuate in shape), outer upright short side 17–17', and upright long sides 18–18' and 19–19', respectively, all sides of each tray being interconnected, and preferably, disposed at an inward angle of about 20° to 30°, say about 22°, with respect to bottom 15–15' (particularly the long sides). The depth of the tray 13–13' is about $\frac{3}{8}$" to about $\frac{1}{4}$", and it is filled with rubber 23, or other suitable tread material, the top of which is to be flat and level with the sides. Since there is provided a lower tray (to be described later) for protection against piercing objects, upper tray 13–13' has the central section of its bottom 15–15' cut out at 50, and the sides 51 of the cut out portion are raised and provided with a small flange 52 at each side to provide a better grip on the tread material 23 which might otherwise be pulled out by a slanting nail.

The lower tread portion 14 is in the form of an inverted tray in which the bottom (now the top 20) is attached to bottom 15 of the upper tray, at juncture 21, by welding, or the like. Tray 14 has long sides 27 and 24 projecting downwardly from bottom 20, and at an angle so that they continue in substantially the same planes as the respective sides 18 and 19 of the upper tray. Also, a small inward flange 53 is provided on the ends of sides 27 and 24 to more securely grip the rubber of base 30 which is bonded onto carcass 10. To more securely anchor tray 14 into base 30, a tapered channel member 54 is welded onto the bottom of top 20. The taper is crosswise the tire because rubber base 30 is thicker at the sides than at the center of the tire, and the channel must not be placed too close to carcass 10 so as to reduce flexibility. Tray 14–14' also has downwardly-directed narrow side 55–55', also preferably provided with a small flange 56. Lower tray 14–14' is filled with rubber which is bonded to the main body of rubber.

One feature of this invention involves the use of embedded balls 29 and 29', which are made of tightly wound textile yarn or thread, or similar material, such as rubberized cotton or rayon thread, and they are embedded in the thickest portion of the rubber base 30 under the outer portions of the tread elements, and specifically under lower tray portions 14–14′. These balls are about ¾″ to ⅞″ in diameter, for the passenger tire used herein as an example, say a 6.70 x 15 tire. These balls serve as flexible supports for the tread elements, particularly during steering, as they roll with the surrounding flexing rubber. To prevent forcing out of these balls during flexing, there are provided triangular sections 57 of rubberized cord which is bonded to the carcass and to the base 30. These sections may extend as one piece 58 around the entire side of the tire.

In order to protect the portion of the tire top between the tread elements from piercing objects, there are embedded T-shaped strips 33 of metal, such as blue steel sheet ¹⁄₃₂″ thick. These sheets extend under a portion of the sides of adjacent tread elements in the same row, and under a portion of the arcuate side of the tread element in the next row. These strips 33 are exposed between tread elements, but they may be embedded in the rubber base 30, and they are bonded thereto.

To eliminate the possibility of ice layer accumulation over the surfaces of tread material 23, the tread material may be bonded to a layer of sponge rubber 60 (FIGURES 3–4), so that the compression encountered on rolling would crack up any ice layer. Also, the surface of tread material 23 may be raised, as surface 61, above the metal sides 18, 19, etc. to facilitate this ice removal.

For the purposes of this description, the term "rubber" shall include all rubbery material and rubbery tread material used in tire manufacture. The term "thread" shall include yarn and other similar material.

I claim:

1. A pneumatic vehicle tire having a carcass and a flat-surfaced tread, said tread, comprising
   a rubber base having thicker sides and a thinner central portion,
   two series of spaced tread elements disposed side-by-side over the length of the tread, each tread element comprising an upper metal tray portion and a lower inverted metal tray portion attached thereto,
   each tray having a polygonal shape and being shaped wider at the center of the tire than at the side, and each tread elements of one series having a mirror image shape of the elements of the other series, and
   said upper tray being filled with rubber tread material, and said lower tray being filled with rubber material and bonded to said rubber base.

2. A pneumatic vehicle tire having a carcass and a flat-surfaced tread, said tread comprising,
   a rubber base having thicker sides and a thinner central portion,
   two series of spaced tread elements disposed side-by-side over the length of the tread, each tread element comprising an upper metal tray portion and a lower inverted metal tray portion attached thereto,
   each tray having a polygonal shape and being shaped wider at the center of the tire than at the side, and each tread element of one series having a mirror image shape of the elements of the other series,
   said upper tray being filled with rubber tread material, and said lower tray being filled with rubber material and bonded to said rubber base, and
   a ball of thread material disposed under each tread element at near its outer edge and occupying a substantial thickness of said rubber base.

3. A pneumatic vehicle tire according to claim 2 in which a strip of rubberized cord material is disposed under each of said balls and is bonded to a carcass and to said base.

4. A pneumatic vehicle tire according to claim 3 in which the tread elements are generally tetragonal in shape.

5. A pneumatic tire according to claim 3 in which the innermost side of each tread element is arcuate in shape.

6. A pneumatic vehicle tire according to claim 3 in which each tread element of one series is positioned in staggered relation with respect to each element of the other series.

7. A pneumatic vehicle tire according to claim 3 in which the tread elements of one series are disposed with their innermost sides substantially in abutment with the innermost sides of the tread elements of the other series.

8. A pneumatic vehicle tire having a carcass and a flat-surfaced tread, said tread, comprising,
   a rubber base having thicker sides and a thinner central portion,
   two series of spaced tread elements disposed side-by-side over the length of the tread, each tread element comprising an upper metal tray portion and a lower inverted metal tray portion attached thereto,
   each tray having a polygonal shape and being shaped wider at the center of the tire than at the side, and each tread element of one series having a mirror image shape of the elements of the other series,
   said upper tray being filled with rubber tread material, and said lower tray being filled with rubber material and bonded to said rubber base,
   a ball of thread material disposed under each tread element at near its outer edge and occupying a substantial thickness of said rubber base, and
   a series of metal sheets disposed over said base and disposed between adjacent of said tread elements and extending from under one adjacent side of a tread element across to under the adjacent side of the next tread element of the series, and serving to protect said intervening area from punctures.

9. A pneumatic vehicle tire having a carcass and a flat-surfaced tread, said tread comprising:
   a rubber base having thicker sides and a thinner central portion,
   two series of spaced tread elements disposed side-by-side over the length of the tread, each tread element comprising an upper metal tray portion and a lower inverted metal tray portion attached thereto,
   each tray having a polygonal shape and being shaped wider at the center of the tire than at the side, and each tread element of one series having a mirror image shape of the elements of the other series,
   said upper tray being filled with rubber tread material, and said lower tray being filled with rubber tread material and bonded to said rubber base,
   a ball of rubberized thread material disposed under each tread element at near its outer edge and occupying a substantial thickness of said rubber base,
   a series of metal sheets disposed in said base and disposed between adjacent of said tread elements and extending from under one adjacent side of a tread element across to under the adjacent side of the next tread element of the series, and service to protect said intervening area from punctures, and
   anchoring means disposed within and attached to said upper tray and designed to prevent pulling out of the tread material contained therein.

10. A pneumatic vehicle tire according to claim 9 in which the lower tray has anchoring means disposed within and attached thereto and designed to prevent pulling of said lower tray out of said base.

11. A pneumatic vehicle tire having a carcass and a flat-surfaced tread, comprising, in combination,
    a rubber base designed to support said tread and having thicker sides and a thinner central portion,
    said tread comprising a plurality of outwardly-projecting encasing frameworks of hard rigid sheet material, the bottom portions of which are anchored in said base, and each framework having a pad of rubbery compound filling said framework, said pad being designed to present a flat surface even with the framework edges during rolling of said tire on a pavement.

12. A pneumatic tire according to claim 11 in which said framework surrounds a plate of hard rigid sheet material on which said pad is disposed.

13. A pneumatic tire according to claim 12 in which strips of rigid sheet material are imbedded in said base between said frameworks and designed to resist puncturing by sharp objects.

References Cited by the Examiner

UNITED STATES PATENTS

| | | | |
|---|---|---|---|
| 598,330 | 2/1898 | Vreeland | 152—185 X |
| 1,317,185 | 9/1919 | Twombly | 152—175 X |

FOREIGN PATENTS 17,983  1906  Great Britain.

EUGENE G. BOTZ, *Primary Examiner.*

ARTHUR L. LA POINT, *Examiner.*

C. W. HAEFELE, *Assistant Examiner.*